(12) United States Patent
Akiyama et al.

(10) Patent No.: US 9,309,982 B2
(45) Date of Patent: Apr. 12, 2016

(54) VEHICLE DEVICE TEMPERATURE ADJUSTMENT SYSTEM

(75) Inventors: Yuki Akiyama, Tokyo (JP); Tadashi Osaka, Tokyo (JP); Masatsugu Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/236,095

(22) PCT Filed: Aug. 17, 2011

(86) PCT No.: PCT/JP2011/068606
§ 371 (c)(1),
(2), (4) Date: Jan. 30, 2014

(87) PCT Pub. No.: WO2013/024535
PCT Pub. Date: Feb. 21, 2013

(65) Prior Publication Data
US 2014/0174708 A1 Jun. 26, 2014

(51) Int. Cl.
*F16K 17/36* (2006.01)
*B60R 16/00* (2006.01)
(Continued)

(52) U.S. Cl.
CPC ............ *F16K 17/36* (2013.01); *B60H 1/00271* (2013.01); *B60H 1/00278* (2013.01); *B60H 1/00978* (2013.01); *B60K 11/06* (2013.01);
(Continued)

(58) Field of Classification Search
CPC .............................. F16K 17/36; B60L 3/0046
USPC ................ 180/271; 429/120; 165/202, 41, 71
See application file for complete search history.

(56) References Cited

U.S. PATENT DOCUMENTS 4,126,108 A * 11/1978 Christensen ................ 123/41.14
4,231,384 A * 11/1980 Christensen .................... 137/62
(Continued)

FOREIGN PATENT DOCUMENTS

DE   10 2006 004 781 A1   8/2007
DE   10 2009019944 A1   11/2009
(Continued)

OTHER PUBLICATIONS

International Search Report dated Sep. 13, 2011 with English translation (five (5) pages).
(Continued)

*Primary Examiner* — Marc Norman
*Assistant Examiner* — Devon Russell
(74) *Attorney, Agent, or Firm* — Crowell & Moring LLP

(57) ABSTRACT

A temperature-adjustment system for a vehicle includes temperature-adjustment passages and obtained by circularly connecting a battery, an inverter, a DC/DC converter, a traveling motor, and a pump that circulates the heat medium that adjusts temperatures by cooling/heating the heat generation elements, are provided. The temperature-adjustment passages and are provided with proportional valves that interrupt the flow of the heat medium and adjust the flow volume of the heat medium, an air flow-in part that introduces air into the battery temperature-adjustment passage, and a heat medium discharge part that discharges the heat medium from the temperature-adjustment passage to outside of the vehicle. The proportional valve, air flow-in part, battery, pump, and heat medium discharge part are preferably arranged in that order, and the proportional valve is closed and an air take-in valve and a heat medium discharge valve are opened.

3 Claims, 7 Drawing Sheets

(51) Int. Cl.
  *B60H 1/00* (2006.01)
  *B60K 11/06* (2006.01)
  *B60L 3/00* (2006.01)
  *B60L 1/00* (2006.01)
  *B60L 11/18* (2006.01)
  *H01M 10/6568* (2014.01)
  *H01M 10/6567* (2014.01)
  *B60K 11/04* (2006.01)
  *H01M 10/625* (2014.01)
  *B60K 11/02* (2006.01)
  *B60K 1/00* (2006.01)

(52) U.S. Cl.
  CPC ............... *B60L1/003* (2013.01); *B60L 3/0046* (2013.01); *B60L 3/0069* (2013.01); *B60L 11/1874* (2013.01); *B60R 16/00* (2013.01); *H01M 10/6567* (2015.04); *H01M 10/6568* (2015.04); *B60K 11/02* (2013.01); *B60K 11/04* (2013.01); *B60K 2001/003* (2013.01); *B60K 2001/005* (2013.01); *B60K 2001/006* (2013.01); *B60L 2240/36* (2013.01); *B60L 2240/545* (2013.01); *B60Y 2306/01* (2013.01); *B60Y 2306/05* (2013.01); *H01M 10/625* (2015.04)

(56) References Cited

U.S. PATENT DOCUMENTS

| | | | | |
|---|---|---|---|---|
| 4,766,925 | A | * | 8/1988 | Frantz ............................ 137/62 |
| 5,323,847 | A | * | 6/1994 | Koizumi et al. ......... 165/104.33 |
| 5,518,047 | A | * | 5/1996 | Alexandrowski ............... 141/59 |
| 5,673,733 | A | * | 10/1997 | Turcotte et al. ................ 141/65 |
| 5,849,029 | A | * | 12/1998 | Eckhouse et al. ............. 607/104 |
| 6,371,157 | B1 | * | 4/2002 | See et al. .................. 137/565.22 |
| 8,157,047 | B2 | * | 4/2012 | Breed ........................... 180/282 |
| 2008/0251235 | A1 | * | 10/2008 | Zhou ............................... 165/41 |
| 2009/0126910 | A1 | * | 5/2009 | Campbell et al. ........ 165/104.33 |
| 2009/0139781 | A1 | * | 6/2009 | Straubel ....................... 180/65.1 |
| 2009/0142653 | A1 | * | 6/2009 | Okada et al. .................. 429/120 |
| 2009/0280395 | A1 | * | 11/2009 | Nemesh et al. .................. 429/62 |
| 2010/0012295 | A1 | * | 1/2010 | Nemesh et al. .......... 165/104.19 |
| 2011/0111269 | A1 | * | 5/2011 | Tse .................................. 429/50 |
| 2011/0113800 | A1 | | 5/2011 | Sekiya et al. |
| 2012/0024517 | A1 | | 2/2012 | Imanishi et al. |
| 2012/0037352 | A1 | * | 2/2012 | Osaka et al. ................... 165/202 |
| 2012/0096927 | A1 | * | 4/2012 | Freund ........................ 73/31.03 |
| 2012/0159986 | A1 | | 6/2012 | Imanishi et al. |
| 2012/0222438 | A1 | | 9/2012 | Osaka et al. |
| 2012/0222441 | A1 | | 9/2012 | Sawada et al. |
| 2012/0222446 | A1 | | 9/2012 | Sekiya et al. |
| 2013/0027882 | A1 | * | 1/2013 | Iwasa et al. ................... 361/699 |

FOREIGN PATENT DOCUMENTS

| | | | |
|---|---|---|---|
| DE | 102011075627 A1 | * | 11/2012 |
| EP | 1 964 697 A2 | | 9/2008 |
| FR | 2974453 A1 | * | 10/2012 |
| JP | 2-155172 A | | 6/1990 |
| JP | 2000-71755 A | | 3/2000 |
| JP | 4062996 B2 | | 3/2008 |
| JP | 2010-252510 A | | 11/2010 |
| JP | 2011-26956 A | | 2/2011 |
| JP | 2011-105150 A | | 6/2011 |
| JP | 2011-105151 A | | 6/2011 |
| JP | 2011-111139 A | | 6/2011 |
| JP | 2011-111140 A | | 6/2011 |
| JP | 2011-112312 A | | 6/2011 |
| JP | 2011-134657 A | | 7/2011 |
| JP | 2011134657 A | * | 7/2011 |
| JP | 2011134659 A | * | 7/2011 |
| JP | 2011151893 A | * | 8/2011 |
| JP | 2012-30699 A | | 2/2012 |
| JP | 2012-35812 A | | 2/2012 |
| WO | WO 2007/087992 A1 | | 8/2007 |
| WO | WO 2011077980 A1 | * | 6/2011 |

OTHER PUBLICATIONS

European Search Report dated Mar. 25, 2015 (three (3) pages).

* cited by examiner

VEHICLE DEVICE TEMPERATURE ADJUSTMENT SYSTEM

TECHNICAL FIELD

The present invention relates to a system that adjusts temperatures of devices for vehicles such as a battery and a motor, and for example, relates to a vehicle device temperature adjustment system that can secure safety against a collision and the like.

BACKGROUND ART

In a vehicle on which a battery for traveling is mounted, the energy density of the battery is limited compared with the fuel that drives an internal-combustion engine. Therefore, to improve a cruising distance and an output, it is important to use the battery under conditions where the battery can easily exert the performance. One of the conditions that affect the performance of the battery is a temperature. Since there is a range of suitable use temperature, it is indispensable to control the temperature to allow the battery to exert a maximum performance.

To control the temperatures of the vehicle devices such as a battery and a motor, a high level of promptness and accuracy of the temperature control is required in the vehicle device temperature adjustment system that adjusts the temperatures of the vehicle devices. To improve the flexibility of arrangement of the device temperature adjustment system, a liquid heat medium having a large heat capacity is used. A liquid heat medium such as a coolant typically used as the heat medium for adjusting the temperatures of the vehicle devices is a conductor. When the heat medium is used to control the temperatures of heat generation elements such as a battery, an electric component, and an electronic device that are used by being energized, there is a concern of heat generation and ignition due to electric leakage and a short circuit if a conduction portion and the heat medium come in contact with each other due to damage to a pipe that circulates the heat medium. In addition, it is necessary to assume that an automobile that is a traveling body may be damaged due to a collision and the like.

As a related technology of the present technical field, there is Japanese Patent No. 4062996 (PTL 1). PTL 1 discloses, in order to prevent the electric leakage to a human body, a method of detecting a collision, and enclosing and electrically insulating cooling water by closing valves before and after a fuel battery cooling part of a pipe with emergency isolation valves, and a mechanism of the emergency insulation valve.

Similarly, as a related technology, there is Japanese Patent Application Laid-Open No. 2010-252510 (PTL 2). PTL 2 discloses a structure in which a collision is predicted, and a cooling water passage is electrically blocked with a blocking means into a section where the cooling water may be charged and the other section.

CITATION LIST

Patent Literatures

PTL 1: Japanese Patent No. 4062996
PTL 2: Japanese Patent Application Laid-Open No. 2010-252510

SUMMARY OF INVENTION

Technical Problem

Typically, when the temperature adjustment of a heat generation element such as a battery, an electric component, or an electronic device used by being energized is performed with a liquid heat medium that is a conductor, there is a risk that the heat medium becomes a conduction path when a pipe of the heat medium, the battery, the electric component, or the electronic device is subject to any damage. Above all, a battery mounted for traveling of an automobile has a large output, and it is necessary to assume physical damage to the temperature adjustment system due to a collision and the like as an expected state, and to secure the safety. This problem is particularly important for the battery having a large output, and is also common to traveling bodies that incorporate a battery, an electric component, an electronic device and the like, the temperatures of which are to be adjusted with the liquid heat medium that is a conductor.

The technology disclosed in PLT 1 solves the prevention of the electric leakage to a human body, and the technology disclosed in PLT 2 is a technology to prevent reduction of an insulation resistance at a collision of a vehicle, where a pipe route is electrically insulated by interruption of a flow of the heat medium from the battery and its surrounding area to the pipe route at a collision. However, in this method, when the pipe near the battery is damaged, the possibility that the heat medium comes in contact with the battery and a short circuit is caused cannot be eliminated. Even if the conduction to the human body is avoided, there is a concern that the short circuit of the battery causes heat generation and ignition. In addition, to prevent the damage to the battery and the pipe near the battery, a high strength against a shock or deformation to the battery and the pipe near the battery is required, and weight saving is difficult.

The present invention has been made in view of the above problems, and an objective is to provide a temperature adjustment system that prevents electric leakage and a short circuit due to contact between the heat medium that adjusts the temperature by cooling/heating devices and the devices such as a battery, at a collision of a vehicle.

Solution to Problem

To solve the above problems, a vehicle device temperature adjustment system according to the present invention comprises a temperature adjustment passage circularly connecting a heat generation element as a vehicle device, and a pump adapted to circulate a heat medium that cools/heats the heat generation element. The temperature adjustment passage includes a passage open/close means adapted to interrupt a flow of the heat medium and to adjust a flow volume of the heat medium, an air take-in means adapted to introduce an air into the temperature adjustment passage, and a heat medium discharge means adapted to discharge the heat medium from the temperature adjustment passage to an outside of a vehicle. The passage open/close means, the air take-in means, the heat generation element, the pump, and the heat medium discharge means are arrange in the temperature adjustment passage in that order. When a collision of a vehicle is detected or predicted, the passage open/close means is closed, the air take-in means and the heat medium discharge means are opened, and the pump is stopped after being driven for a predetermined time.

Advantageous Effects of Invention

In a temperature adjustment system that adjusts the temperatures of the vehicle devices as the heat generation elements such as a battery, an electric component, and an electronic device, with a conductive liquid heat medium, electric leakage and a short circuit through the heat medium due to damage to a pipe of the heat medium can be prevented by discharging the heat medium. In addition, the structure is simple, and the weight saving of the system can be achieved.

DESCRIPTION OF EMBODIMENTS

Hereinafter, a vehicle device temperature adjustment system according to the present invention will be described with reference to the drawings.

First Embodiment

Figure 1:
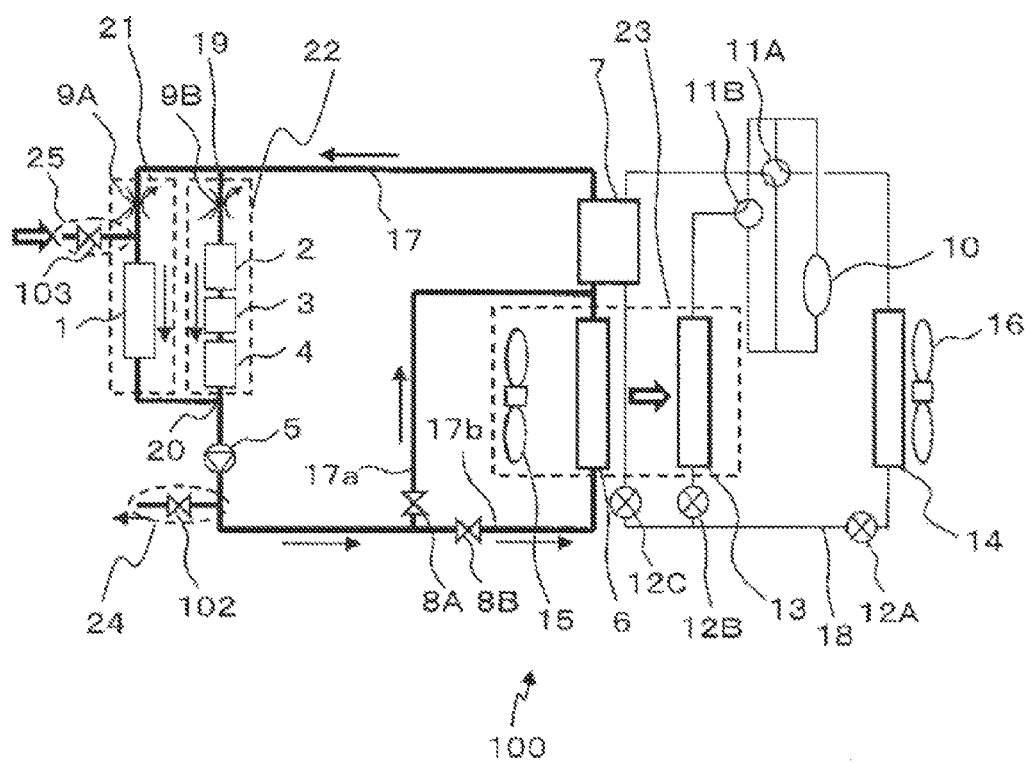
FIG. 1 is a block diagram illustrating a structure of a first embodiment of a vehicle device temperature adjustment system according to the present invention.

FIG. 1 illustrates a first embodiment in which a vehicle device temperature adjustment system of the present invention is applied to an electric vehicle, and illustrates a structure of a temperature adjustment system 100 using a block diagram. The first embodiment illustrates a temperature adjustment system provided with a function to discharge a heat medium using a pump.

The vehicle device temperature adjustment system 100 is provided with, as major functions, a function to perform temperature adjustment of a plurality of devices as heat generation elements, and a function to perform air conditioning by recovering waste heat from the plurality of devices. The temperature adjustment of the devices is intended to allow each device to operate at a suitable temperature. As a range of suitable temperature, an electronic device or a motor typically has an upper limit of an operation temperature to avoid being damaged, and the battery efficiently operates at a not-too-high and not-too-low temperature.

When a battery 1, an inverter 2, a DC/DC converter 3, and a traveling motor 4 that are major heat generation elements in the electric vehicle are objects, temperatures of which are to be adjusted using a heat medium, the battery 1 is different from other devices in that the battery 1 requires warming up at a low temperature, and the upper limit temperature is lower than that of other heat generation elements. Therefore, the first embodiment branches a passage into two systems: a battery temperature adjustment passage 21 that adjusts only the temperature of the battery 1 as one system, and a device temperature adjustment passage 22 that adjusts the temperatures of the inverter 2, the DC/DC converter 3, and the traveling motor 4 as another system, so that the temperature adjustment and the waste heat recovery are individually performed. Note that the passage may be branched into three or more systems according to the number of the heat generation elements, the temperatures of which are to be adjusted, and may be appropriately set.

As other heat generation portions in the electric vehicle, there are a gear box that generates heat due to friction of a bearing and agitation of lubricant oil, a friction brake that generates friction heat, and the like, and the heat generation portions such as the bear box and the friction brake may be included into the objects of temperature adjustment and waste heat recovery with the heat medium.

In a case of cooling, the temperature of the heat medium that passes through the devices arranged in series in the same passage becomes higher toward a downstream. Therefore, it is favorable to arrange, from the upstream, the devices in the same passage in ascending order of upper limit of allowable temperature. In addition, in a case of heating, the temperature of the heat medium becomes lower toward the downstream. Therefore, it is favorable to arrange the devices in the same passage in descending order of lower limit of allowable temperature.

An indoor cooling heat exchanger 6 that exchanges heat with the air that blows out into a car cabin, an intermediate heat exchanger 7 that exchanges heat with a refrigerant, and a heat medium passage branch part 19 are arranged on a pipe route 17 in which the heat medium is circulated. A proportional valve 9B, the inverter 2, the DC/DC converter 3, and the traveling motor 4 are arranged on the device temperature adjustment passage 22 that is one passage in a heat medium passage branched section. A proportional valve 9A and the battery 1 are arranged on the battery temperature adjustment passage 21 that is the other passage in the heat medium passage branched section. A heat medium passage join part 20 where the both passages join, and a pump 5 that circulates the heat medium are provided on a pipe route 17. The proportional valves 9A and 9B constitute a passage open/close means that interrupts the flow of the heat medium and adjusts the flow. Note that the pipe route 17 can switch a passage 17b that allows the heat medium to flow into the indoor cooling heat exchanger 6 to a passage 17a that does not allow the heat medium to flow into the indoor cooling heat exchanger 6 by opening/closing of two-way valves 8A and 8B.

The flow ratio of the heat medium between the battery temperature adjustment passage 21 that adjusts the temperature of the battery 1 and the device temperature adjustment passage 22 that adjusts the temperatures of the inverter 2, the DC/DC converter 3, and the traveling motor 4 can be changed with the proportional valves 9A and 9B. The total flow of the heat medium that is a total of the flows of the both passages can be controlled by the rotation speed of the pump 5. When the flow volume of the heat medium that passes through the battery 1, the inverter 2, the DC/DC converter 3, and the traveling motor 4 that are the objects of temperature adjustment is increased/decreased, the thermal conductivity between the devices, the temperature of which are to be adjusted, and the heat medium is changed, whereby the ability of temperature adjustment can be adjusted by an element other than the increase/decrease of the temperature of the heat medium. Therefore, the two systems having different ranges of suitable temperature can be independently adjusted by control of the rotation speed of the pump 5 and openings of the proportional valves 9A and 9B.

An air flow-in part 25 is provided at an upstream side of the battery 1 in the battery temperature adjustment passage 21. The air flow-in part 25 connects a pipe having an open end part to a passage pipe, and an air take-in valve 103 is connected to the pipe. The end part of the pipe to which the air take-in valve 103 is connected is open, and the air can be taken into the battery temperature adjustment passage 21 by opening the air take-in valve 103. The pump 5 is arranged at a downstream of the heat medium passage join part 20 where the battery temperature adjustment passage 21 and the other device temperature adjustment passage 22 join, and a heat medium discharge part 24 is provided at a further downstream. The heat medium discharge part 24 connects a pipe having an open end part to the passage pipe from the pipe route 17 at a downstream of the pump 5, and a heat medium discharge valve 102 is connected to the pipe. It is structured such that the heat medium in the passage can be discharged by opening of the heat medium discharge valve 102.

The intermediate heat exchanger 7 that exchanges heat with the heat medium, an indoor air conditioning heat exchanger 13 that exchanges heat with the air blowing out into the car cabin, an outdoor heat exchanger 14 that exchanges heat with the outside air, expansion valves 12A to 12C that select a heat exchanger to be used and controls a refrigerating cycle, a switching valve (four-way valve) 11A and a switching valve (three-way valve) 11B for switching the direction of the refrigerant that flows in each heat exchanger, and a compressor 10 that compresses and circulates the refrigerant are provided on a pipe route 18 that constitutes the refrigerating cycle. The air volume of the outside air that passes through the outdoor heat exchanger 14 can be adjusted by the rotation speed of an outdoor fan 16.

The flow of the air in an indoor unit 23, which performs air conditioning in the car cabin, is as follows: the outside air or the air in the car cabin is sucked by an indoor fan 15, passes through the indoor cooling heat exchanger 6 and the indoor air conditioning heat exchanger 13 in order and performs heat exchange, and is blown out into the car cabin.

To decrease in temperature of the heat medium, the directions of the switching valves 11A and 11B and the openings of the expansion valves 12A, 12B, and 12C are set to constitute a refrigerating cycle in which the intermediate heat exchanger 7 thermally connected with the heat medium is used as an evaporator, and the indoor air conditioning heat exchanger 13 or the outdoor heat exchanger 14 is used as a condenser. To increase in temperature of the heat medium, the switching valves 11A and 11B and the expansion valves 12A, 12B, and 12C are set to use the intermediate heat exchanger 7 as a condenser and to use the indoor air conditioning heat exchanger 13 or the outdoor heat exchanger 14 as an evaporator.

Since the indoor air conditioning heat exchanger 13 exchanges heat with the air that blows out into the car cabin, whether the indoor air conditioning heat exchanger 13 is used as a condenser or used as an evaporator is set corresponding to a cooling/heating operation. To decrease in temperature of the air blowing out into the car cabin, the indoor air conditioning heat exchanger 13 is used as an evaporator, and to increase in temperature blowing out into the car cabin, the indoor air conditioning heat exchanger 13 is used as a condenser.

Further, the indoor cooling heat exchanger 6 also performs heat exchange between the heat medium and the air blowing out into the car cabin. Therefore, the opening/closing of the two-way valves 8A and 8B is switched in accordance with the cooling/heating operation. For example, to heat the air when the temperature of the air sucked in the indoor cooling heat exchanger 6 is lower than that of the heat medium, the two-way valve 8A is closed and the two-way valve 8B is opened, and the heat medium is caused to flow into the passage 17b side and is sent to the indoor cooling heat exchanger 6. In this way, the heating operation can be performed, which uses the waste heat of the heat generation element for heating of the air (waste heat recovery). Further, when it is not necessary to heat the air sucked into the indoor cooling heat exchanger 6, the two-way valve 8A is opened and the two-way valve 8B is closed, and the heat medium is sent to the passage 17a side, so that the transfer of the heat medium to the indoor cooling heat exchanger 6 is not performed.

As described above, the device temperature adjustment by the temperature control of the heat medium and the cooling/heating by the temperature control of the air blowing out into the car cabin can be performed by changing the directions of the switching valves 11A and 11B, the rotation speed of the compressor 10, the openings of the expansion valves 12A, 12B, and 12C, the rotation speed of the indoor fan 15, and the rotation speed of the outdoor fan 16.

Figure 2:
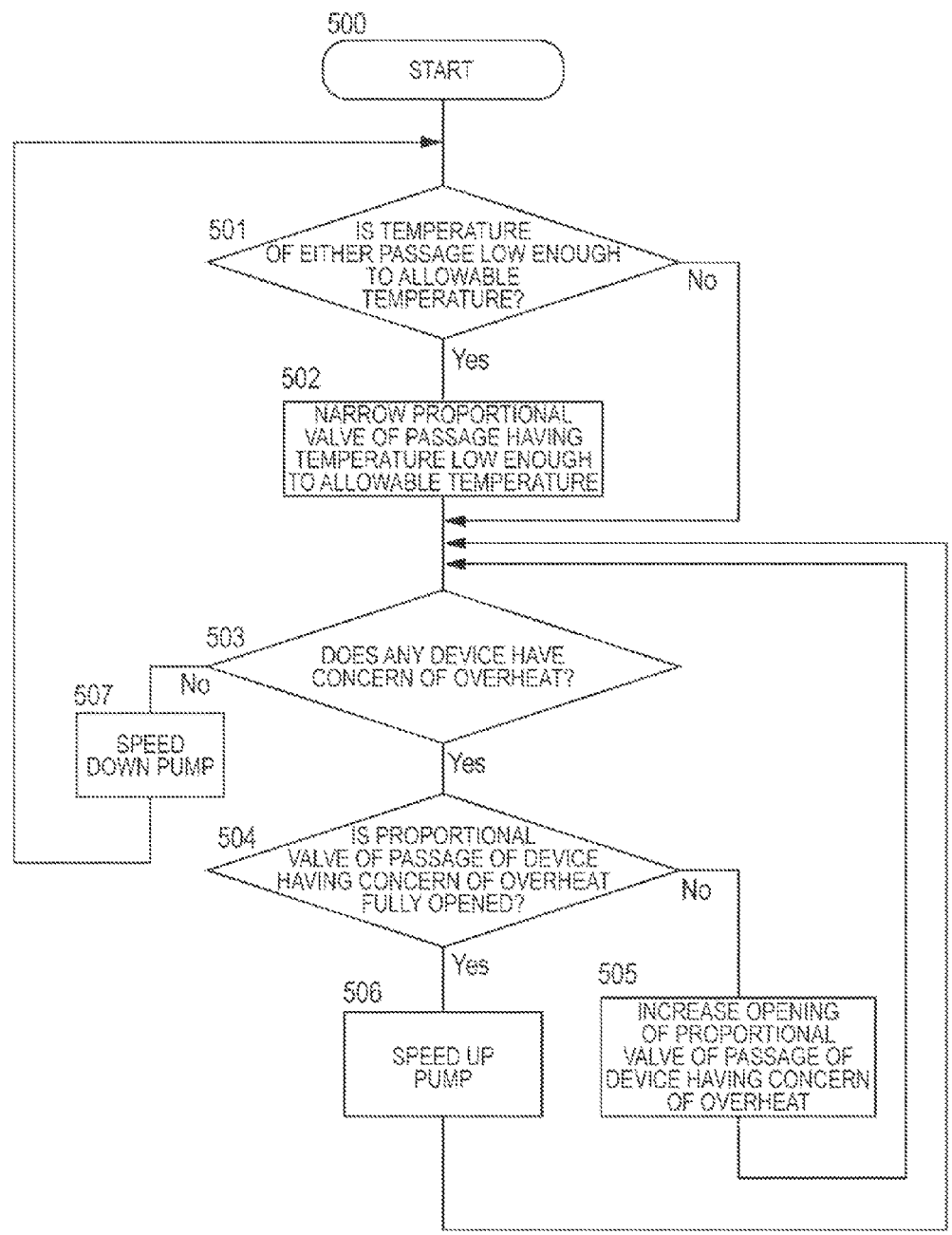
FIG. 2 is a flowchart illustrating an operation of adjusting temperatures of two systems with a heat medium in the temperature adjustment system of FIG. 1.

Next, an operation of independently performing the temperature adjustment of the battery temperature adjustment passage 21 that adjusts the temperature of the battery 1 and the device temperature adjustment passage 22 that adjusts the temperatures of the inverter 2, the DC/DC converter 3, and the traveling motor 4, which are the two passages of the heat medium, will be described with reference to the flowchart of FIG. 2.

Since the temperatures of the object devices of temperature adjustment are changed in the direction approaching the temperature of the heat medium, the temperature of the heat medium is constantly maintained equal to or less than the lowest upper limit temperature of an object device among the upper limit temperatures of the object devices of temperature adjustment. The temperature of the heat medium is controlled using the refrigerating cycle through the intermediate heat exchanger 7. The battery 1 may need warming up, and therefore, an operation to be performed is roughly classified into the following two ways depending on the relationship between the temperature of the heat medium and the temperature of the battery. In both ways, the proportional valves 9A and 9B are fully opened as an initial state. Then, the temperature of the heat medium, and the temperatures of the battery and the vehicle devices are compared, and if the temperature of the heat medium is lower than the temperatures of the battery and the vehicle devices, the following cooling operation is performed, and if the temperature of the heat medium is higher, a heating operation is performed.

When either the temperature of the battery temperature adjustment passage 21 or the temperature of the device temperature adjustment passage 22 of the inverter 2, the DC/DC converter 3, and the traveling motor 4 is low enough to the allowable temperature (step S501), the proportional valve of the passage is narrowed (step S502). When any of the devices has a concern of overheat (step S503) and the proportional valve of the passage on which the device having the concern of overheat is arranged is not fully opened (step S504), the opening of the proportional valve is increased (step S505). When the proportional valve is fully opened, the pump 5 is speeded up (the flow volume is increased) (step S506). In step S503, when no device has a concern of overheat, the pump 5 is speeded down (the flow volume is decreased) (step S507). By repetition of the above steps, the temperatures of all of the devices are maintained to the allowable temperatures or less while the rotation speed of the pump 5 being suppressed.

Further, when the temperature of the heat medium and the temperature of the battery are compared, and the temperature of the battery is lower than the temperature of the heat medium, the following operation of cooling other devices is performed while warming up of the battery being performed, as needed.

Similarly to the case of performing only cooling, the other devices are controlled so that a device outside the range of allowable temperature set to the device or a device closest to the range of allowable temperature among the battery 1, the inverter 2, the DC/DC converter 3, and the traveling motor 4 can be maintained within the range of allowable temperature while the rotation speed of the pump 5 being minimized. In the process, when the temperatures of all of the devices in the passages are low enough to the allowable temperature, the proportional valves of the passages are narrowed. When any of the devices has a concern to fall outside the range of allowable temperature, and the proportional valve of the passage in which the device exists is not fully opened, the opening of the proportional valve is increased. When any of the devices has a concern to fall outside the range of allowable temperature, and the proportional valve of the passage in which the device exists is fully opened, the pump 5 is speeded up (the flow volume is increased), and the temperatures of all of the devices are maintained within the ranges of allowable temperature.

A measurement place of the temperature of the heat medium for the temperature adjustment control is set immediately before the heat medium passage branch part 19 that is a place close to an inlet temperature of the object device of heat adjustment, and where the heat medium is not stayed even if either the proportional valve 9A or 9B is closed. As described above, the vehicle device temperature adjustment system 100 can deliver the heat required for the temperature adjustment of the devices and the indoor air conditioning using the heat medium and the refrigerating cycle.

Next, the function to discharge the heat medium using the pump 5 in the temperature adjustment system 100 of FIG. 1 will be described. Since the pump 5 for heat medium circulation is also used for heat medium discharge, the pump 5 is arranged immediately after the heat medium passage join part 20. To minimum the total amount of the heat medium to be transferred for heat medium discharge, the heat medium discharge valve 102 is arranged immediately after the pump 5, and the minimum amount of the heat medium is discharged from the heat medium discharge part 24. The heat medium discharge part 24 is provided at a lower surface of a vehicle body in order to prevent the discharged heat medium from running along the vehicle to come in contact with the battery, an electric component, and an electronic device.

It is necessary to fill the space in the pipe of the section from which the heat medium is discharged with another fluid, for example, the air. Therefore, a valve to take the air into the pipe from an outside is provided. To minimize the total amount of the heat medium to be moved for the heat medium discharge, the air take-in valve 103 is provided between the proportional valve 9A and the battery 1 on the battery temperature adjustment passage 21.

Next, an operation of each part in discharging the heat medium will be described. When a collision of the vehicle or a state where the collision cannot be avoided is detected, the proportional valves 9A and 9B are closed, the air take-in valve 103 and the heat medium discharge valve 102 are opened, and the pump 5 is driven at a maximum output. Then, the pump 5 is stopped after the heat medium is discharged from the battery temperature adjustment passage 21. The order of the operations except the stop of the pump 5 may be changed. If the pressure of the battery temperature adjustment passage 21 is a negative pressure when the air take-in valve 103 is opened, the heat medium does not flow out from the air take-in valve 103. Therefore, the air take-in valve 103 may be opened when the pressure becomes a negative pressure. Alternatively, by giving priority to promptness of discharge of the heat medium and allowing the heat medium to flow out from the air take-in valve 103 to a certain extent, the air take-in valve 103 may be opened before the pressure of the battery temperature adjustment passage 21 becomes a negative pressure. Alternatively, by using the air take-in valve 103 as a check valve, and when the pressure of the pipe becomes a negative pressure, the air may be allowed to flow in from an outside at the atmospheric pressure.

The pump 5 may be stopped by detection of the discharge of the heat medium by a flow volume sensor or a conductive sensor for the fluid in the pipe. However, if the sensor is omitted and the pump 5 is stopped after a time required for the discharge of the heat medium set in advance has elapsed, the cost of the sensor can be cut down. The time required for the discharge of the heat medium is obtained from the flow volume based on the size and the shape of the battery temperature adjustment passage 21 and the pump property.

The detection of a collision or the state where the collision cannot be avoided that is necessary for determination of the discharge of the heat medium may be performed using information of operation condition determination of an air bag or a seatbelt pretensioner or information of various sensors used by a pre-crush safety device, or a collision detection sensor may be separately installed.

In a case of a pipe structure that has a concern of a backflow of the heat medium after the discharge of the heat medium, where, for example, a passage section from which the heat medium is not discharged exists at downstream and above of a passage section from which the heat medium is discharged, a check valve is provided immediately after the heat medium discharge part 24, so that the backflow of the heat medium to the passage section from which the heat medium is discharged may be prevented.

As described above, in the first embodiment, the heat medium can be discharged from the battery temperature adjustment passage 21, and therefore, electric leakage and a short circuit of the battery due to flowing out of the heat medium for temperature adjustment into the vicinity of the battery at a collision can be avoided.

Second Embodiment

Figure 3:
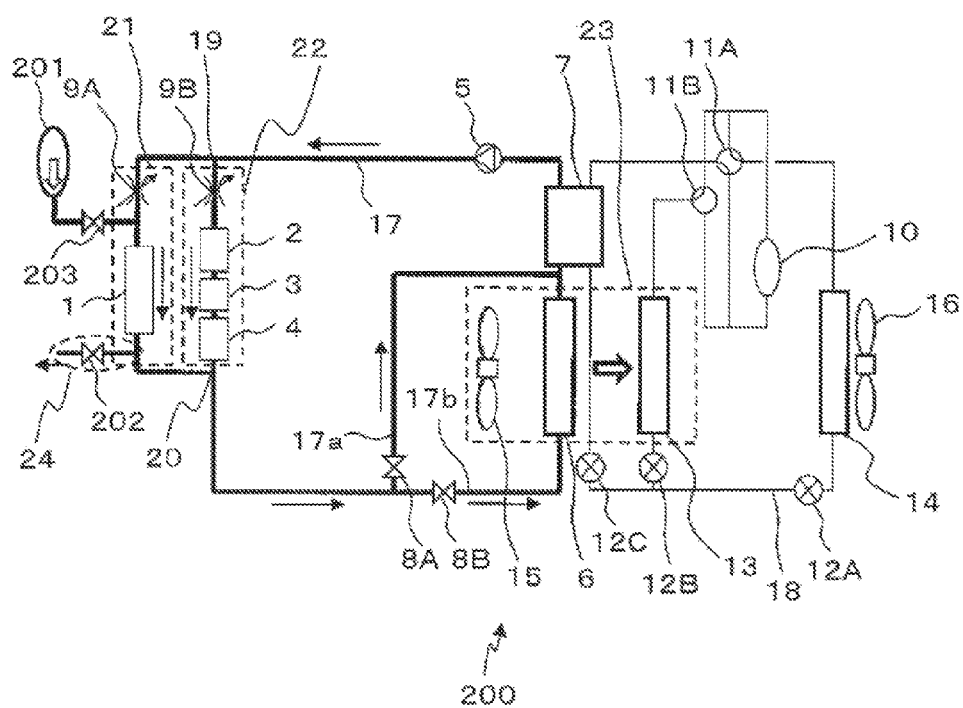
FIG. 3 is a block diagram illustrating a structure of a second embodiment of a vehicle device temperature adjustment system according to the present invention.

A second embodiment of a vehicle device temperature adjustment system according to the present invention is a temperature adjustment system 200 provided with a function to discharge a heat medium from a battery temperature adjustment passage 21 using a high pressure gas. Hereinafter, the second embodiment will be described in detail with reference to FIG. 3. FIG. 3 is a block diagram illustrating a structure of the temperature adjustment system 200 of the present embodiment.

In FIG. 3, a container 201 that supplies a high pressure gas to the battery temperature adjustment passage 21 is connected between a proportional valve 9A and a battery 1 of the battery temperature adjustment passage 21 with a container connection valve 203 being closed. It is necessary to move the heat medium in a section from the container connection valve 203 to a heat medium discharge valve 202 for discharge of the heat medium. To minimize the total amount of the heat medium to be moved, the container connection valve 203 is arranged immediately before the battery 1, and the heat medium discharge valve 202 for discharging the heat medium into an outside is arranged immediately after the battery 1. A heat medium discharge part 24 including the heat medium discharge valve 202 is provided at a lower surface of a vehicle body in order to prevent the discharged heat medium from running along the vehicle to come in contact with a battery, an electric component, and an electronic device. The container 201 that supplies a high pressure gas is provided near the center of the vehicle in order to prevent the container 201 from becoming nonfunctional by being subject to an exogenous shock or damage.

The high pressure gas may be used by being compressed and enclosed in the container, or may be generated using a state change or a chemical change. For prompt discharge of the heat medium, the amount of the gas enclosed or generated in the container 201 sufficiently exceeds the atmospheric pressure when being filled in the volume of the battery temperature adjustment passage 21. Since the structure other than the above is similar to that of the first embodiment, the description thereof is omitted.

Next, an operation of each part in discharging the heat medium from the battery temperature adjustment passage 21 will be described. When a collision of the vehicle or a state where the collision cannot be avoided is detected, a pump 5 is stopped, proportional valves 9A and 9B are closed, the heat medium discharge valve 202 is opened, the container connection valve 203 is opened and the high pressure gas is injected into a pipe of the battery temperature adjustment passage 21, and the heat medium is discharged from the battery temperature adjustment passage 21. The order of the operations may be changed.

The present embodiment exerts similar functions and effects to the first embodiment described above as well as being excellent in reliability because, when the heat medium is discharged, the high pressure fluid is supplied from the container 201 to the battery temperature adjustment passage 21 to move the heat medium, and no power source is required. In addition, a high pressure can be easily obtained compared with a pump, and therefore, the present embodiment is excellent in promptness of discharge of the heat medium.

Third Embodiment

Figure 4:
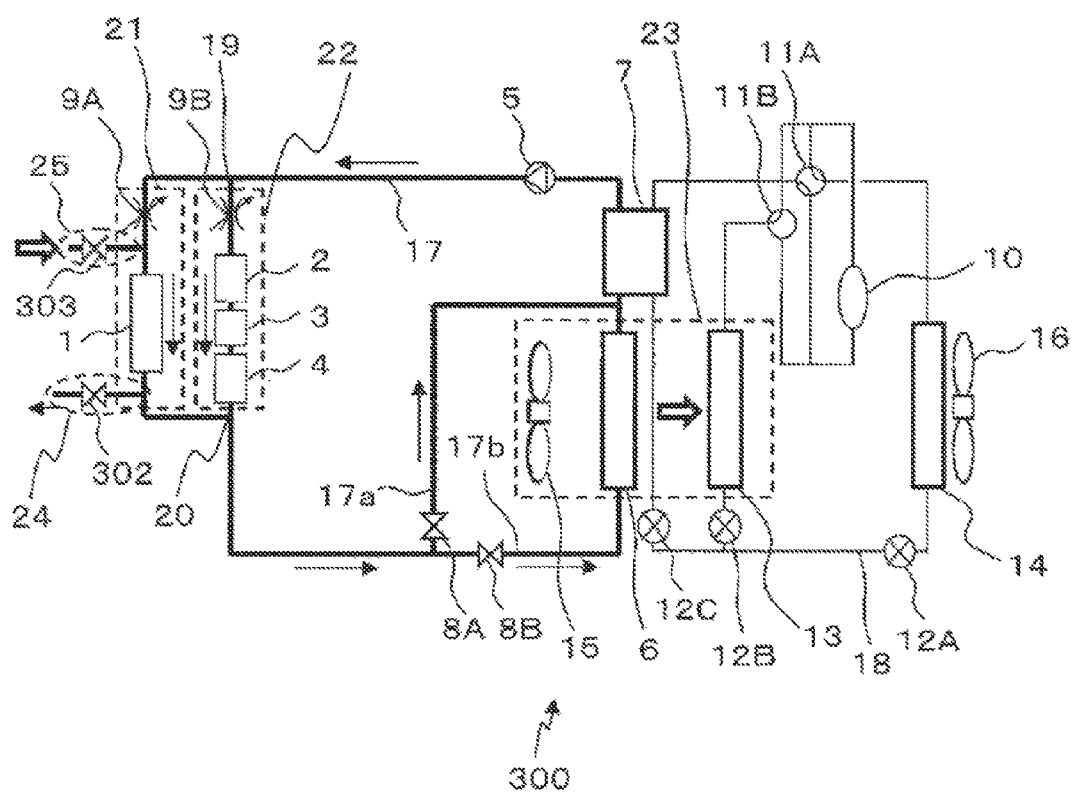
FIG. 4 is a block diagram illustrating a structure of a third embodiment of a vehicle device temperature adjustment system according to the present invention.
Figure 5:
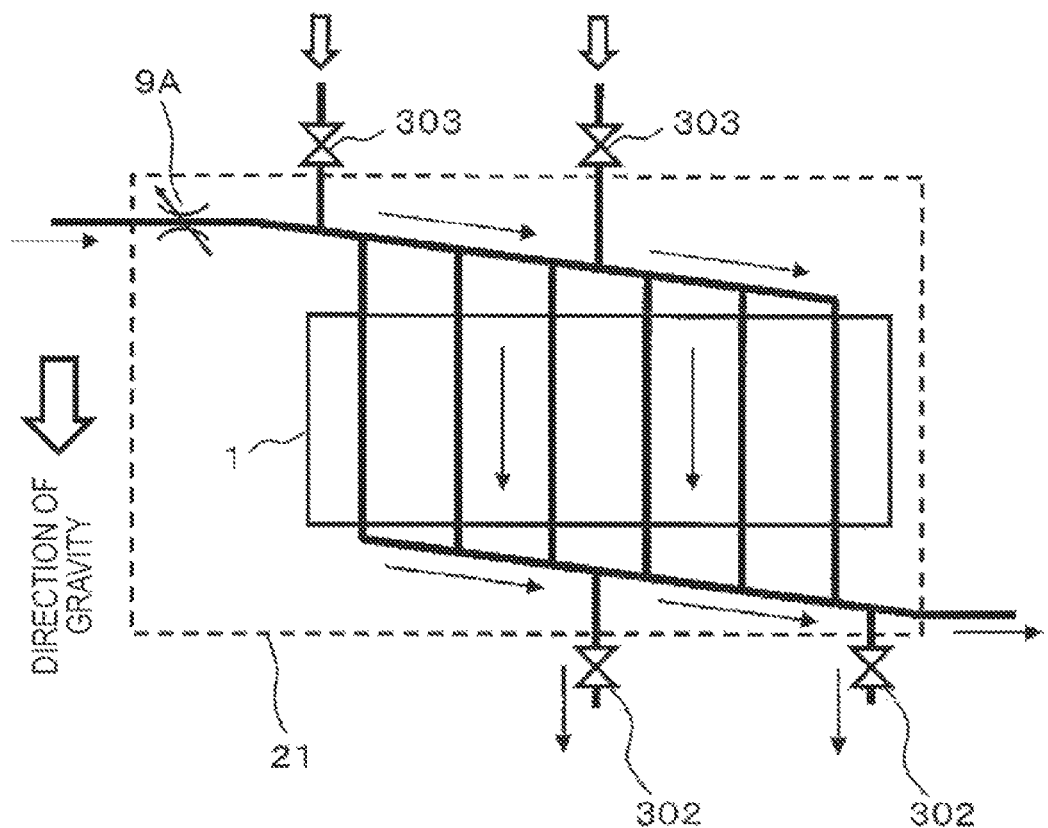
FIG. 5 is a substantial part structure diagram illustrating a battery temperature adjustment passage portion of the temperature adjustment system illustrated in FIG. 4.

A third embodiment of a vehicle device temperature adjustment system according to the present invention is a temperature adjustment system 300 provided with a function to discharge a heat medium by its weight. Hereinafter, the third embodiment will be described in detail with reference to FIGS. 4 and 5. FIG. 4 is a block diagram illustrating a structure of the temperature adjustment system 300 of the present embodiment, and FIG. 5 extracts the battery temperature adjustment passage 21 from FIG. 4 as an example of a battery temperature adjustment passage 21 of the present embodiment and illustrates a substantial part structure of a passage piped in a battery 1.

In the third embodiment, to minimize the total amount of the heat medium to be discharged and to fill a pipe after discharge of the heat medium with the air, an air take-in valve 303 to take in the air from an outside is provided between a proportional valve 9A and the battery 1 of the battery temperature adjustment passage 21, and is arranged immediately before the battery 1. Then, a heat medium discharge valve 302 for discharging the heat medium outside is arranged immediately after the battery 1. The air take-in valve 303 is installed above the battery 1 in the vertical direction, the heat medium discharge valve 302 is installed below the battery 1 in the vertical direction, and the heat medium flowing in the battery 1 can be discharged from the passage by gravity. A heat medium discharge part 24 including the heat medium discharge valve 302 is provided at a lower surface of a vehicle body in order to prevent the discharged heat medium from running along the vehicle to come in contact with the battery, an electric component, and an electronic device. The heat medium in the passage from the air take-in valve 303 to the heat medium discharge valve 302 downwardly flows along the passage by the gravity.

For prompt discharge of the heat medium under the atmospheric pressure, the air take-in valve 303 and the heat medium discharge valve 302 may be provided at a plurality of places in a passage section from which the heat medium is discharged. When a plurality of heat medium discharge valves 302 is provided, all lengths of the passage from one or more air take-in valves 303 to the plurality of heat medium discharge valves 302 are made equal so that the heat medium can be basically discharged at the same time. Note that, since the structure other than the above is similar to the first embodiment, the description thereof is omitted.

Next, an operation of each part in discharging the heat medium will be described. When a collision of the vehicle or a state where the collision cannot be avoided is detected, a pump 5 is stopped, proportional valves 9A and 9B are closed, the air take-in value 303 is opened, the heat medium discharge valve 302 is opened, and the heat medium is discharged from the battery temperature adjustment passage 21 by its weight. The order of the operations may be changed. The third embodiment exerts similar functions and effects to the first and second embodiments described above as well as being excellent in reliability because, when the heat medium is discharged, a power source to move the heat medium and a mechanism to pressure a gas are not required.

Fourth Embodiment

The first, second, and third embodiments described above have been provided with the heat medium discharge valves 102, 202, and 302, and the air take-in valves 103, 203, and 303 for heat medium discharge. In a fourth embodiment, a heat medium discharge part 24 or an air flow-in part 25 is released by physical destruction, instead of installation of the heat medium discharge valves 102, 202, and 302, and the air take-in valves 103, 203, and 303.

Figure 6:
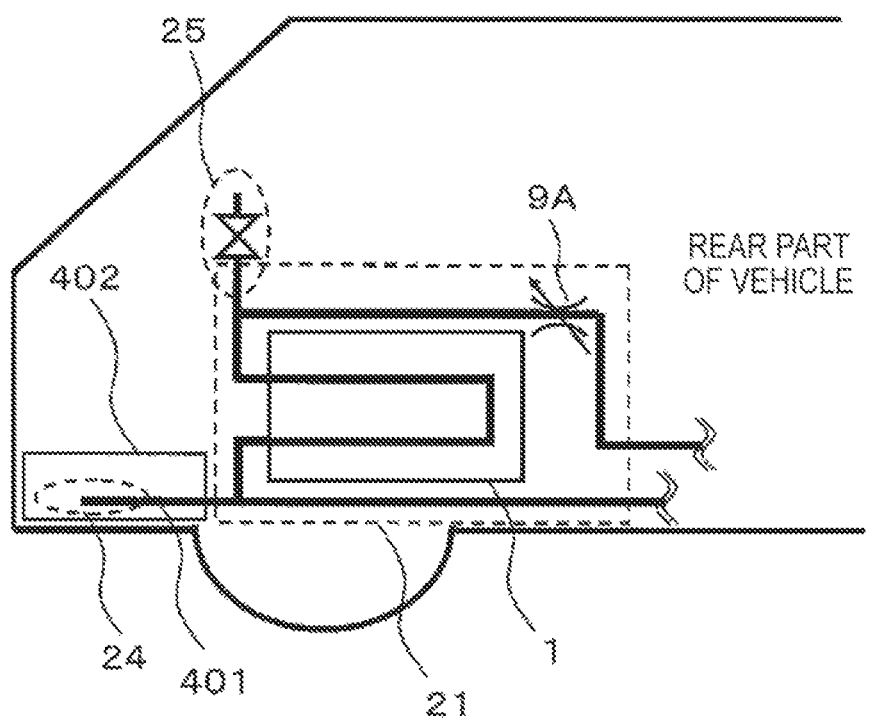
FIG. 6 is a substantial part structure diagram illustrating a fourth embodiment of a vehicle device temperature adjustment system according to the present invention.

Hereinafter, the fourth embodiment of a vehicle device temperature adjustment system according to the present invention will be described with reference to the drawing. FIG. 6 is characterized in that the air flow-in part 25 uses the air take-in valves 103, 203, and 303, similarly to the first to third embodiments and the heat medium discharge part 24 is released by physical destruction. FIG. 6 illustrates only a part of a battery temperature adjustment passage 21, and since the structure other than the battery temperature adjustment passage 21 is the same as the first to third embodiments, the description thereof is omitted.

In FIG. 6, the battery temperature adjustment passage 21 is arranged around a battery 1 that is mounted in a rear part of a vehicle. A heat medium discharge valve for discharge of the heat medium is not provided, and a heat medium discharge pipe 401 that can be easily destroyed is arranged and fixed to a shock absorption member 402 that is a portion of a vehicle body being subject to damage by a collision to the vicinity of the battery 1. The heat medium discharge pipe 401 constitutes the heat medium discharge part 24 that discharges the heat medium from a destroyed portion by having a structure being destroyed together with the vehicle body. The heat medium discharge pipe 401 is provided at a lower surface of the vehicle body in order to prevent the discharged heat medium from running along the vehicle to come in contact with the battery, an electric component, and an electronic device.

The heat medium discharge pipe 401 employs the quality of material that has low toughness and is easily broken in order to be surely destroyed at a collision, while the strength in ordinary use is secured. For example, the quality of material of the heat medium discharge pipe 401 is a cast and is structured to be easily destroyed at a collision. However, other material may be employed as long as a similar effect can be obtained.

In this structure, when the heat medium discharge pipe 401 is destroyed, the discharge means illustrated in the first to third embodiments is operated. Detection of the destruction of the heat medium discharge pipe 401 may be indirectly performed by a sudden change of a pressure obtained from a pressure sensor in the pipe (not illustrated) or a sudden change of a load of a pump 5. The position where the pressure sensor in the pipe is installed may be immediately before or after the place to be destroyed so that the fluctuation of the pressure due to the destruction of the heat medium discharge pipe 401 can be easily obtained.

When the heat medium discharge pipe 401 of the shock absorption member 402 is destroyed at a collision of the vehicle, the valve of the air flow-in part 25 is opened, and the air is taken into the battery temperature adjustment passage 21, and the heat medium between the air flow-in part 25 and the heat medium discharge part 24 is discharged from the passage by its weight. Since the heat medium discharge pipe 401 is arranged at a lower part of the vehicle body, the discharged heat medium does not come in contact with the battery 1, and electric leakage and a short circuit can be prevented.

Fifth Embodiment

Figure 7:
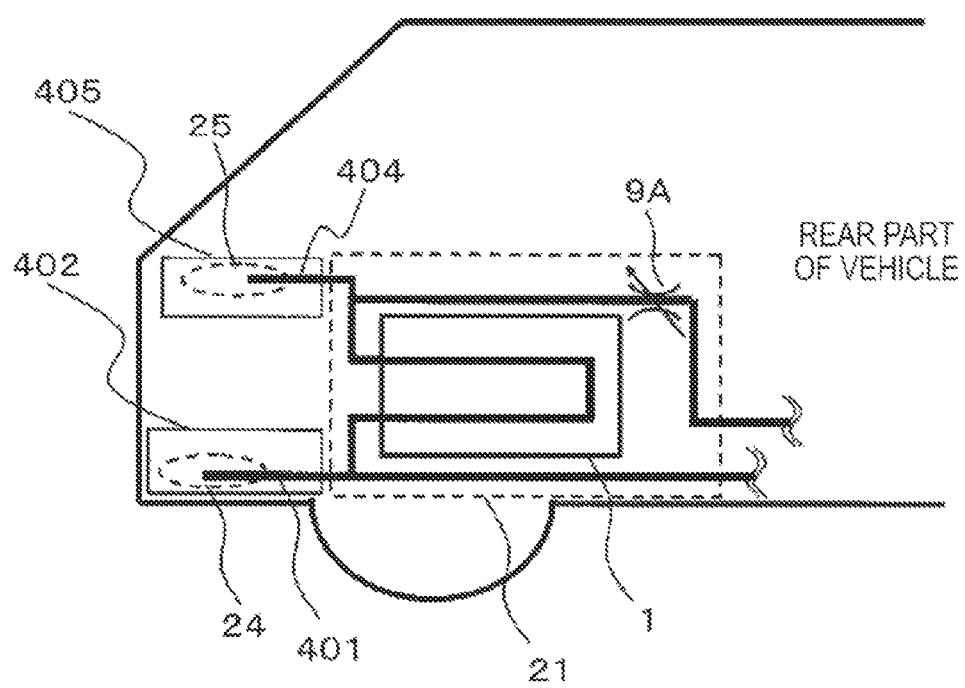
FIG. 7 is a substantial part structure diagram illustrating a fifth embodiment of a vehicle device temperature adjustment system according to the present invention.

Next, a fifth embodiment in which a heat medium discharge part 24 and an air flow-in part 25 are released by physical destruction and the heat medium is discharged, instead of installation of the heat medium discharge valves 102 and 302, and the air take-in valves 103 and 303 in the first and third embodiments, will be described with reference to FIG. 7. FIG. 7 illustrates a substantial part structure diagram of the fifth embodiment, and illustrates only a part of a battery temperature adjustment passage 21. The structure other than the battery temperature adjustment passage 21 is the same as the first and third embodiments, and therefore, the description thereof is omitted.

The battery temperature adjustment passage 21 is arranged around a battery 1 mounted at a rear part of a vehicle, and a heat medium discharge valve for heat medium discharge and an air take-in valve for air flow-in are not provided. A heat medium discharge pipe 401 is arranged and fixed to a shock absorption member 402 that is a portion of the vehicle body being subject to damage by a collision to the vicinity of the battery 1, and an air flow-in pipe 404 is arranged and fixed to a shock absorption member 405. The pipes 401 and 404 employ the quality of material that has low toughness and are easily broken in order to be surely destroyed, while the strength in ordinary use is secured. The quality of material of the pipes 401 and 404 is a cast. However, other material may be employed as long as a similar effect can be obtained.

The position of the air flow-in pipe 404 on the vehicle is relatively above the pipe 401 in the vertical direction because the pipe 401 that discharges the heat medium is installed at a lower surface of the vehicle body. With this structure, the heat medium discharge pipe 401 and the air flow-in pipe 404 are destroyed at a collision, and the air flows into the temperature adjustment passage 21 from the air flow-in pipe positioned above, the heat medium in the temperature adjustment passage 21 can be surely discharged from the heat medium discharge pipe 401. Therefore, the electric leakage and a short circuit of the battery 1 at the collision and the like can be prevented. Note that the pipes 401 and 404 may be integrated with the shock absorption members 402 and 405 as the same part, instead of the pipes 401 and 404 being arranged and fixed to the shock absorption members 402 and 405.

The surface of the portion of the pipe to be destroyed may be covered with a mark having a fine and continuous pattern to cause it to be an unrecoverable seal. The seal guarantees the function to discharge the heat medium or allow the air to flow in by the destruction, and the pipe once destroyed can be found when the pipe is recovered without through quality control, and reuse of the pipe, the function of which cannot be guaranteed, can be prevented.

As described above, the embodiments of the present invention have been described. However, the present invention is not limited to the above-described embodiments, and various design changes can be performed without departing from the spirit of the present invention described in claims. For example, the description of the embodiments have been given in detail for the purpose of describing the invention in an easy-to-understand manner, and a part of the structure of a certain embodiment can be replaced with the structure of another embodiment, and the structure of a certain embodiment can be added to the structure of another embodiment. In addition, a part of the structure of each embodiment can be added to, deleted from, and replaced with another structure.

REFERENCE SIGNS LIST

1 Battery (vehicle device)
2 Inverter (vehicle device)
3 DC/DC converter (vehicle device)
4 Traveling motor (vehicle device)
5 Pump
6 Indoor cooling heat exchanger
7 Intermediate heat exchanger
8A and 8B Two-way valve
9A and 9B Proportional valve (passage open/close means)
10 Compressor
11A Switching valve (four-way valve)
11B Switching valve (three-way valve)
12A to 12C Expansion valve
13 Indoor air conditioning heat exchanger
14 Outdoor heat exchanger
15 Indoor fan
16 Outdoor fan
17 Pipe route of heat medium
18 Pipe route of refrigerant
19 Heat medium passage branch part
20 Heat medium passage join part
21 Battery temperature adjustment passage
22 Device temperature adjustment passage (temperature adjustment passage for inverter, DC/DC converter and traveling motor)
23 Indoor unit
24 Heat medium discharge part
25 Air flow-in part
100 Temperature adjustment system provided with function to discharge heat medium using pump
102 Heat medium discharge valve
103 Air take-in valve (air take-in means)
200 Temperature adjustment system provided with function to discharge heat medium using high pressure gas
201 Container supplying high pressure gas
202 Heat medium discharge valve
203 Container connection valve
300 Temperature adjustment system provided with function to discharge heat medium by its weight 302 Heat medium discharge valve (heat medium discharge means)
303 Air take-in valve (air take-in means)
401 Heat medium discharge pipe (heat medium discharge means)
402 Shock absorption member
404 Air flow-in pipe
405 Shock absorption member

The invention claimed is:

1. A vehicle device temperature adjustment system, comprising a temperature adjustment passage connecting in a circular manner a heat generation element, and a pump that circulates a heat medium that cools or heats the heat generation element,
   the temperature adjustment passage including
   a passage open or close means that interrupts a flow of the heat medium and to adjust a flow volume of the heat medium,
   an air take-in means that introduces an air into the temperature adjustment passage, and
   a heat medium discharge means that discharges the heat medium from the temperature adjustment passage to an outside of a vehicle, wherein
   when a collision of a vehicle is detected or predicted, the passage open or close means is closed, the air take-in means and the heat medium discharge means are opened, and the pump is stopped after being driven for a predetermined time,
   the predetermined time is a time required for discharging the heat medium in a section from the air take-in means to the heat medium discharge means, and
   the pump, during its predetermined pumping time, drains a portion of the heat medium from the air take-in means to the heat medium discharge means along the portion in which the heat generation element is located.

2. A vehicle device temperature adjustment system, comprising a temperature adjustment passage connecting in a circular manner a heat generation element, and a pump adapted to circulate a heat medium that cools or heats the heat generation element,
   the temperature adjustment passage including
   a passage open or close means adapted to interrupt a flow of the heat medium and to adjust a flow volume of the heat medium,
   an air take-in means adapted to introduce an air into the temperature adjustment passage, and
   a heat medium discharge means adapted to discharge the heat medium from the temperature adjustment passage to an outside of a vehicle,
   wherein the heat medium discharge means is structured with a pipe to be destroyed by a shock at a collision of the vehicle.

3. A vehicle device temperature adjustment system, comprising a temperature adjustment passage connecting in a circular manner a heat generation element, and a pump adapted to circulate a heat medium that cools or heats the heat generation element,
   the temperature adjustment passage including
   a passage open or close means adapted to interrupt a flow of the heat medium and to adjust a flow volume of the heat medium,
   an air take-in means adapted to introduce an air into the temperature adjustment passage, and
   a heat medium discharge means adapted to discharge the heat medium from the temperature adjustment passage to an outside of a vehicle,
   wherein the air take-in means is structured with a pipe to be destroyed by a shock at a collision of the vehicle.

* * * * *